Patented July 27, 1937

2,088,535

UNITED STATES PATENT OFFICE 2,088,535

HALOGENATED ETHERS OF RESIN ALCOHOLS AND METHOD OF PRODUCING THEM

Alfred L. Rummelsburg, Wilmington, Del., assignor to Hercules Powder Company, Wilmington, Del., a corporation of Delaware No Drawing. Application August 8, 1935, Serial No. 35,306

28 Claims. (Cl. 260—149)

This application relates to halogenated ethers of resin alcohols and more particularly to halogenated ethers of abietyl alcohol and hydrogenated abietyl alcohol and to methods for their production.

The term "resin alcohol" is descriptive of those alcohols, usually primary alcohols, produced by reduction of the hydroaromatic acids occurring in natural resins. Thus, for example, rosin is composed principally of the hydroaromatic acid abietic acid, $C_{19}H_{29}COOH$, together with varying amounts of its isomer, pimaric acid. Other natural resins contain various related hydroaromatic acids, some of unknown constitution. Upon reduction, by suitable methods, of these resin acids, the corresponding resin alcohols may be obtained. Thus, by the reduction of abietic acid, there will be produced, depending upon the particular method employed, abietyl alcohol, $C_{19}H_{29}CH_2OH$, or a hydrogenated abietyl alcohol as, for example, dihydroabietyl alcohol, $C_{19}H_{31}CH_2OH$, and tetrahydroabietyl alcohol, $C_{19}H_{33}CH_2OH$. Reduction of pimaric acid will produce in the same way various pimaryl alcohols or hydrogenated pimaryl alcohols.

Abietyl alcohol may be produced by the reduction of abietic acid or, preferably, an abietic acid ester, such as methyl abietate, by means of sodium in alcoholic solution in accordance with the method described by Ruzicka and Meyer, Helv. Chim. Acta 5, 581–93 (1932). Similarly hydrogenated abietyl alcohol may be produced by treatment of hydro-abietic acid, or preferably its esters, in the same manner. Hydro-abietyl alcohol may likewise be produced by catalytic hydrogenation of abietyl alcohol produced in the manner described above. It is more convenient, however, to produce hydrogenated abietyl alcohol by treatment of either abietic acid of its esters or hydrogenated abietic acid and its esters with hydrogen at relatively high pressures and temperatures and in the presence of a catalyst such as a metal chromite. It will be understood that the term "hydrogenated abietyl alcohol" is used throughout this specification and in the claims to indicate either dihydroabietyl alcohol, tetrahydroabietyl alcohol or a mixture thereof. The product actually produced in commercial practice by any of the methods described above for the production of hydrogenated abietyl alcohol is a mixture of dihydro and tetrahydroabietyl alcohols in varying proportions.

In accordance with this invention halogenated ethers of resin alcohols such as, for example, abietyl alcohol, hydrogenated abietyl alcohol, pimaryl alcohol, hydrogenated pimaryl alcohol, etc., are produced by reacting the resin alcohol with an aldehyde and a hydrogen halide. The aldehyde used may be, for example, an aliphatic aldehyde, such as formaldehyde (or any of its polymers, for example, trioxymethylene), acetaldehyde, propionaldehyde, butyraldehyde, etc., or an aromatic aldehyde, such as benzaldehyde, etc., or an araliphatic aldehyde. The hydrogen halide used may be hydrogen chloride, hydrogen bromide, and even hydrogen iodide or hydrogen fluoride, although these last two are seldom used.

The reaction involves combination between molar quantities of resin alcohol, aldehyde and hydrogen halide to produce a halogenated ether of the resin alcohol and water. Using an abietyl alcohol for purposes of illustration, the course of the reaction may be indicated as follows:

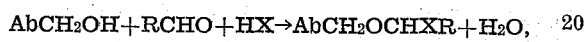

$$AbCH_2OH + RCHO + HX \rightarrow AbCH_2OCHXR + H_2O,$$

where Ab represents the hydrocarbon nucleus of abietyl alcohol ($C_{19}H_{29}$) dihydroabietyl alcohol ($C_{19}H_{31}$), or tetrahydroabietyl alcohol ($C_{19}H_{33}$); R represents hydrogen or an alkyl, aryl or aralkyl group; and X represents a halogen. It will be noted that in all cases an alpha halogenated ether is produced.

The procedure in accordance with this invention for producing halogenated ethers of resin alcohols will comprise bringing the resin alcohol, the aldehyde and the hydrogen halide together under conditions adapted to effect a reaction among these materials. The resin alcohol employed need not be pure and, where a hydrogenated resin alcohol is to be used, the technical product containing from 50 to 100% hydrogenated resin alcohol may be used directly, although preferably the resin alcohol content should be 75% or over. The aldehyde will ordinarily be used in its normal physical condition but, in the case of formaldehyde, it is preferable, for convenience of procedure, to use a polymer, such as trioxy-methylene or the like. Conveniently, the resin alcohol and the aldehyde may be dissolved in molecular proportions in an inert solvent, such as, for example, benzene, xylene, hexane, or the like, and dry hydrogen halide passed through the solution at a temperature of from about 5° C. to about 30° C. until the solution is saturated with the hydrogen halide. After standing for a suitable period, the reaction mixture is separated from the aqueous layer which has formed, is dried and may then be distilled at reduced pressure for the removal of the solvent and excess hydrogen halide. By proceeding in this manner it will be found that yields of from 60 to 90% halogenated ether may be obtained. Where the substituent group is a lower alkyl radical such as methyl, ethyl, etc., the ether may be further purified, if desired, by distillation at reduced pressure.

It will be appreciated that the procedure and conditions of reaction described above are merely illustrative of a convenient method for the preparation of these halogenated ethers and that both the procedure and the conditions of reaction may be varied widely without affecting the operability of the reaction in question and without departing from the scope of this invention. For example, when a polymerized aldehyde containing $n$ mols of unpolymerized aldehyde is used, the quantity of such polymerized aldehyde employed will desirably be $1/n$ molecular weights per mol. of resin alcohol. Furthermore, an excess of aldehyde or polymerized aldehyde may be used with advantageous results and such excess may be removed from the reaction product either by washing the reaction product with water or by distillation at reduced pressure. The inert solvent employed may be used in widely varying amounts and, of course, various inert solvents not specifically named above may be used, in place of those named. While the reaction will preferably be carried out at a temperature of from about 5° C. to about 30° C., the reaction temperature may be varied, if desired, from —20° C. to 150° C. and it will be appreciated that even these limits are not critical for the reaction. The time of treatment will depend largely upon the rate of addition of the hydrogen halide to the reaction mixture and treatment will be continued until the mixture is saturated with hydrogen halide. Ordinarily, this will take from ½ to 8 hours. It is desirable to allow the reaction mixture to stand for several hours after it has been saturated with hydrogen halide, but the length of time which it is permitted to stand may vary widely and is, of course, not critical. Instead of removing the excess hydrogen halide by distillation at reduced pressure, the reaction mixture may be washed rapidly with water to remove the hydrogen halide and then dried and distilled to remove the solvent. It will also be understood that it is not absolutely essential to use a solvent in the reaction, since an excess of resin alcohol will serve as a reaction medium. However, it is preferred to use a solvent both because of the usual relatively high viscosity of the resin alcohols, which makes procedure difficult, and of the difficulty of separation of any excess resin alcohol from the reaction mixture.

The following example of the preparation of the alpha-chlor-methyl ether of hydrogenated abietyl alcohol will serve to illustrate practical procedure in accordance with this invention: 100 grams (0.286 mol.) of crude hydrogenated abietyl alcohol (containing 83% alcohol) and 9 grams (0.3 mol.) of trioxy-methylene are dissolved in 125 grams of benzene. Dry hydrogen chloride is then passed through the mixture for about 6 to 8 hours and the temperature of the mixture during this period is maintained between 5° C. and 30° C. The reaction mixture is allowed to stand at room temperature for several hours, is then separated from the lower layer of water which has formed, and rapidly washed with water until substantially neutral. During the treatment with HCl, the trioxymethylene which remains insoluble goes into solution. After drying with anhydrous sodium sulphate, the reaction mixture is distilled at about 18 mm. pressure and a bath temperature of 120° C. (at the end) to remove all the benzene. The product thus obtained is a light yellow colored viscous liquid having an alcoholic acid number of 115 and an alcoholic saponification number of 121 (theory 139). It contained, as shown by analysis, 8.0% chlorine (theory 8.6%). The yield is accordingly approximately 90%, based on saponification value and the halogen analysis. The halogen in these compounds is in general so reactive that it may be titrated substantially as hydrochloric acid with alkali solutions.

The alcoholic acid number and alcoholic saponification number referred to above are so designated because in the analytical determination an alcohol is caused to react with the alpha-halogenated ether and the amount of HCl liberated determined.

The alcoholic acid number is determined in the following manner:

From 1 to 3 g. of the material, weighed to the nearest mg., is dissolved in 50–75 cc. of neutral ethyl alcohol and titrated with 0.5 N alkali, using phenol-phthalein as indicator.

Alcoholic acid number =
$$\frac{\text{cc. alkali} \times \text{normality factor} \times 56.1}{\text{wt. sample in g.}}$$

The alcoholic saponification number is determined in the following manner:

From 1 to 3 g. of the material, weighed to the nearest mg., is diluted with 50 cc. neutral ethyl alcohol. 25 cc. of ⅔ N alcoholic KOH is added from a constant delivery pipette. Reflux gently for about one hour. Cool to room temperature and titrate with 0.5 N H₂SO₄ or HCl using phenolphthalein indicator. Blank determinations using the same amount of alcoholic ⅔ N KOH are made at the same time. B = cc. acid for blank, S = cc. acid required for sample.

Alcoholic sapn. number =
$$\frac{(B-S) \times \text{normality factor} \times 56.1}{\text{wt. sample in g.}}$$

By following substantially the same procedure the alpha-chlor-ethyl ether may be produced by using a chemically equivalent quantity of acetaldehyde in place of the trioxy-methylene, and the alpha-chlor-propyl ether, by using propionaldehyde. By using a chemically equivalent quantity of benzaldehyde in this procedure, the alpha-chlor-benzyl ether may be obtained. If hydrogen bromide is used instead of hydrogen chloride, the corresponding alpha-brom ethers will be obtained.

The alpha halogenated ethers of resin alcohols in accordance with this invention are valuable as chemical intermediates for use in the formation of various resinous alkyl, aryl and aralkyl acetals. They may also be used as intermediates for condensation with phenols, cresols, etc., for the production of valuable synthetic resins. The high activity of the alpha halogen atom also makes them capable of undergoing numerous condensations with various organic compounds with the production of valuable new compounds, many of which are resinous in nature and may be used in the synthetic plastic and coating composition fields.

It will be appreciated that the details and examples hereinbefore set forth are illustrative only and are in no way in limitation of the invention as herein broadly described and claimed.

What I claim and desire to protect by Letters Patent is:

1. A halogenated ether having the formula $$AbCH_2OCH-R,$$
$$\quad\quad\quad |$$
$$\quad\quad\quad X$$

where Ab is a member of the group consisting of the hydrocarbon nuclei of abietyl alcohol, dihydroabietyl alcohol, and tetrahydroabietyl alcohol; R is a member of the group consisting of hydrogen, alkyl, aralkyl, and aryl groups; and X is a halogen.

2. The method of producing a halogenated ether of a resin alcohol which includes reacting together a resin alcohol, an aldehyde and a hydrogen halide.

3. The method of producing a hologenated ether of a resin alcohol which includes treating a mixture of a resin alcohol and an aldehyde with a hydrogen halide.

4. The method of producing a halogenated ether of a resin alcohol which includes treating a solution of a resin alcohol and an aldehyde in an inert solvent with a hydrogen halide.

5. The method of producing a halogenated ether of a resin alcohol which includes treating a solution of a resin alcohol and an aldehyde in an inert solvent with a hydrogen halide at a temperature of from about 5° C. to about 30° C.

6. The method of producing a halogenated ether of a resin alcohol which includes treating a solution of molar quantities of a resin alcohol and an aldehyde in an inert solvent with a hydrogen halide.

7. The method of producing a halogenated ether of a resin alcohol which includes treating a solution of a resin alcohol and an aldehyde in an inert solvent with a hydrogen halide, the aldehyde being present in amount in excess of that necessary for complete reaction.

8. The method of producing a halogenated ether of a resin alcohol which includes saturating a solution of a resin alcohol and an aldehyde in an inert solvent with a hydrogen halide.

9. The method of producing a halogenated ether of a resin alcohol which includes treating a solution of a resin alcohol and an aldehyde in an inert solvent with a hydrogen halide, removing free hydrogen halide and the solvent and recovering the halogenated ether.

10. The method of producing a halogenated ether of a resin alcohol which includes treating a solution of a resin alcohol and an aldehyde in an inert solvent with a hydrogen halide, removing free hydrogen halide, distilling off the solvent under reduced pressure and recovering the halogenated ether.

11. The method of producing a halogenated ether of a resin alcohol which includes reacting together a resin alcohol selected from the group consisting of abietyl alcohol and hydrogenated abietyl alcohol, an aldehyde and a hydrogen halide.

12. The method of producing a halogenated ether of a resin alcohol which includes treating a mixture of an aldehyde and a resin alcohol selected from the group consisting of abietyl alcohol and hydrogenated abietyl alcohol with a hydrogen halide.

13. The method of producing a halogenated ether of a resin alcohol which includes treating a solution of an aldehyde and a resin alcohol selected from the group consisting of abietyl alcohol and hydrogenated abietyl alcohol in an inert solvent with a hydrogen halide.

14. A halogenated ether of a resin alcohol, having the formula, $$Re-OCH-R$$
$$\quad\quad |$$
$$\quad\quad X$$

where Re is the radical of a resin alcohol ReOH; R is a member of the group consisting of hydrogen, alkyl, aralkyl, and aryl groups; and X is a halogen.

15. A halogenated ether of a hydrogenated resin alcohol, having the formula, $$Re-OCH-R$$
$$\quad\quad |$$
$$\quad\quad X$$

where Re is the radical of a hydrogenated resin alcohol ReOH; R is a member of the group consisting of hydrogen, alkyl, aralkyl, and aryl groups; and X is a halogen.

16. A halogenated ether having the formula, $$AbCH_2OCH-R,$$
$$\quad\quad\quad |$$
$$\quad\quad\quad X$$

where Ab is the hydrocarbon nucleus of abietyl alcohol; R is a member of the group consisting of hydrogen, alkyl, aralkyl, and aryl groups; and X is a halogen.

17. A halogenated ether having the formula, $$AbCH_2OCH-R,$$
$$\quad\quad\quad |$$
$$\quad\quad\quad X$$

where Ab is the hydrocarbon nucleus of hydrogenated abietyl alcohol; R is a member of the group consisting of hydrogen, alkyl, aralkyl, and aryl groups; and X is a halogen.

18. A halogenated ether having the formula, $$AbCH_2OCH-R,$$
$$\quad\quad\quad |$$
$$\quad\quad\quad X$$

where Ab is the hydrocarbon nucleus of dihydroabietyl alcohol; R is a member of the group consisting of hydrogen, alkyl, aralkyl, and aryl groups; and X is a halogen.

19. A halogenated ether having the formula, $$AbCH_2OCH-R,$$
$$\quad\quad\quad |$$
$$\quad\quad\quad X$$

where Ab is the hydrocarbon nucleus of tetrahydroabietyl alcohol; R is a member of the group consisting of hydrogen, alkyl, aralkyl, and aryl groups; and X is a halogen.

20. A halogenated ether having the formula, $$AbCH_2OCH_2$$
$$\quad\quad\quad |$$
$$\quad\quad\quad X$$

where Ab is a member of the group consisting of the hydrocarbon nuclei of abietyl alcohol, dihydroabietyl alcohol, and tetrahydroabietyl alcohol; and X is a halogen.

21. A halogenated ether having the formula, $$AbCH_2OCH-CH_3$$
$$\quad\quad\quad |$$
$$\quad\quad\quad X$$

where Ab is a member of the group consisting of the hydrocarbon nuclei of abietyl alcohol, dihydroabietyl alcohol, and tetrahydroabietyl alcohol; and X is a halogen.

22. A halogenated ether having the formula, $$AbCH_2OCH-C_6H_5$$
$$\quad\quad\quad |$$
$$\quad\quad\quad X$$

where Ab is a member of the group consisting of the hydrocarbon nuclei of abietyl alcohol, dihydroabietyl alcohol, and tetrahydroabietyl alcohol; and X is a halogen.

23. The method of producing a halogenated ether of a resin alcohol which includes treating a solution of a resin alcohol and an aldehyde in a hydrocarbon solvent with a hydrogen halide.

24. A halogenated ether having the formula $$AbCH_2OCH{-}R$$
$$\qquad\quad |$$
$$\qquad\quad Cl$$

where Ab is a member of the group consisting of the hydrocarbon nuclei of abietyl alcohol, dihydroabietyl alcohol and tetrahydroabietyl alcohol and R is a member of the group consisting of hydrogen, alkyl, aralkyl and aryl groups.

25. A halogenated ether having the formula $$AbCH_2{-}O{-}CH{-}R$$
$$\qquad\qquad\quad |$$
$$\qquad\qquad\quad Cl$$

where Ab is a member of the group consisting of the hydrocarbon nuclei of abietyl alcohol, dihydroabietyl alcohol and tetrahydroabietyl alcohol and R is an alkyl group.

26. A halogenated ether having the formula $$AbCH_2OCH_2$$
$$\qquad\;\; |$$
$$\qquad\;\; Cl$$

where Ab is a member of the group consisting of abietyl alcohol, dihydroabietyl alcohol and tetrahydroabietyl alcohol.

27. The method of producing a halogenated ether of a resin alcohol which includes reacting together a resin alcohol, an aldehyde and hydrogen chloride.

28. The method of producing a halogenated ether of a resin alcohol which includes reacting together a resin alcohol, formaldehyde and hydrogen chloride.

ALFRED L. RUMMELSBURG.